United States Patent [19]

Hsieh

[11] 4,167,493

[45] Sep. 11, 1979

[54] HIGH EFFICIENCY CATALYST FOR HIGH BULK DENSITY POLYETHYLENE

[75] Inventor: John T. Hsieh, Irwin, Pa.

[73] Assignee: Arco Polymers, Inc., Philadelphia, Pa.

[21] Appl. No.: 950,780

[22] Filed: Oct. 12, 1978

Related U.S. Application Data

[63] Continuation-in-part of Ser. No. 780,134, Mar. 22, 1977, abandoned.

[51] Int. Cl.$^2$ .............................. C08F 4/02; C08F 4/64
[52] U.S. Cl. .............................. 252/429 B; 252/429 C; 526/119; 526/124
[58] Field of Search ........................ 252/429 C, 429 B

[56] References Cited

U.S. PATENT DOCUMENTS

| 3,642,746 | 2/1972 | Kashiwa et al. | 252/429 B X |
| 3,644,318 | 2/1972 | Diedrich et al. | 252/429 C X |
| 3,647,772 | 3/1972 | Kashiwa | 252/429 B X |
| 3,694,421 | 9/1972 | Vetter | 252/429 B X |
| 4,016,344 | 4/1977 | Kochhar et al. | 252/429 B X |
| 4,071,674 | 1/1978 | Kashiwa et al. | 252/429 B X |

FOREIGN PATENT DOCUMENTS 1140649  1/1969  United Kingdom .

Primary Examiner—Patrick Garvin
Attorney, Agent, or Firm—Lewis J. Young

[57] ABSTRACT

A unique high efficiency catalyst for the polymerization of ethylene has been developed based on the use of methanol treated magnesium oxide as support, an equimolar mixture of titanium tetrachloride and tetrabutyltitanate as titanium source impregnated on the support, and an organoaluminum compound as reducing agent. The polyethylene produced by this catalyst has narrow molecular weight distribution, high bulk density, high melt index, and minimum catalyst residue due to the high polymer to catalyst ratio.

3 Claims, No Drawings

HIGH EFFICIENCY CATALYST FOR HIGH BULK DENSITY POLYETHYLENE

This application is a continuation-in-part of Ser. No. 780,134 filed Mar. 22, 1977, and now abandoned.

BACKGROUND OF THE INVENTION

The present invention relates to the polymerization of ethylene in the presence of supported catalysts known in the art as Ziegler catalysts.

Ziegler catalysts are commonly formed by reducing a transition metal compound with an organometallic compound. The reduced transition metal compound is then used, in conjunction with an activator, which may be the same or a different organometallic compound, to polymerize olefins, especially ethylene, in the presence of an inert solvent or in the gas phase. A molecular weight regulator, such as hydrogen, may be used with these catalyst systems, as taught by Vandenberg in U.S. Pat. No. 3,051,690.

Such catalysts are often rather unefficient because the catalyst particles tend to agglomerate. To obviate this problem many systems of supporting the catalyst on solid carriers have been proposed.

Kashiwa et al, in U.S. Pat. No. 3,642,746, describe catalysts utilizing a magnesium chloride support pretreated with an electron donor, such as methanol, and then treated with a titanium compound. The electron donor must be coordinated with the magnesium chloride when the titanium compound is added to the support.

Diedrich et al., in U.S. Pat. No. 3,644,318, describe catalysts supported on magnesium alcoholates.

Stevens et al., in U.S. Pat. No. 3,718,636 describe catalysts obtained by reacting a magnesium oxide support with an organometallic compound, separating the resulting solid product and reacting this product with a titanium compound. The polyethylene produced with this catalyst had low melt index and broad molecular weight distribution.

BRIEF SUMMARY OF THE INVENTION

It has now been found that a catalyst having high efficiency for polymerizing ethylene is obtained by treating magnesium oxide with methanol, removing excess methanol, if any, until a concentration of between 0.004 and 10 moles of methanol per mole of magnesium oxide remains, impregnating the oxide with a mixture of titanium tetrachloride and tetrabutlytitanate (1:1 mole ratio) and adding an alkylaluminum compound to reduce the titanium mixture. The polyethylene made with this catalyst has melt indices in the injection molding range, i.e. between 3.1 and 12.5 g./10 min., relatively narrow molecular weight distribution, and high bulk density which prevents reactor fouling and facilitates physical handling of the polymer.

DETAILED DESCRIPTION OF THE INVENTION

The catalyst of the invention comprises a solid complex component obtained by heating a support of magnesium oxide in hexane with methanol, removing the excess methanol by drying the support under vacuum to form a support containing between 0.004 to 10 moles of methanol per mole of magnesium oxide, refluxing the treated magnesium oxide with a 1:1 molar mixture of titanium tetrachloride and tetrabutyltitanate, removing any excess titanium compound by washing the support with an inert hydrocarbon solvent, reacting said support containing titanium compound with an organoaluminum compound of formula $R_nAlX_{3-n}$, wherein R is a hydrocarbon radical selected from branched or linear alkyl, alkenyl, cycloalkyl, aryl, alkylaryl or arylalkyl radicals having 1 to 20 carbon atoms, X is hydrogen or halogen, and n is 1, 2 or 3, and aging the resulting supported complex.

The polymerization of ethylene involves subjecting ethylene in an inert solvent, or in the gas phase, to low pressure polymerization conditions in the presence of a catalytic amount of the above-described catalyst and sufficient organoaluminum compound to activate the catalyst and scavenge any undesirable impurities in the system.

The catalyst is prepared by first thoroughly drying the magnesium oxide support by heating under vacuum at temperatures of from 200° C. to 600° C. for times up to 24 hours. The dried oxide is then suspended in inert hydrocarbon and stirred for 2 to 4 hours at 60° C. with about 20 percent by mole fraction, based on the oxide, of methanol. The support material is then carefully separated from the liquid medium and dried under vacuum. Analysis by infrared shows no alcoholate groups remaining on the magnesium oxide at this point. The drying is continued until the infrared spectrum shows the desired amount of residual methanol is obtained. The concentration of methanol remaining on the support may desirably be between 0.004 and 10 moles of methanol per mole of magnesium oxide. The preferred amounts are between 0.01 and 0.8 moles of methanol per mole of magnesium oxide. Alternatively, the exact mole fraction of methanol desired in the final catalyst may be used to treat the magnesium oxide in hexane and the vacuum drying step omitted. The support is then refluxed with a solution of dibutoxytitanium dichloride in an inert hydrocarbon for 15 to 24 hours. The dibutoxytitanium dichloride is made by mixing equimolar amounts of titanium tetrachloride and tetrabutyltitanate. The excess titanium compound is removed from the support by repeated washing with the inert hydrocarbon solvent. The resulting magnesium oxide support containing the titanium salt is then dispersed in the inert hydrocarbon, and sufficient organoaluminum compound added to produce an aluminum to titanium ratio of between 0.05 and 0.5. The organoaluminum compound useful for the catalyst preparation has been described earlier herein and may be, preferably, triethylaluminum, trihexylaluminium, triisobutylaluminum, diisobutylaluminum hydride, and the like. The resulting catalyst may be used immediately to polymerize ethylene. It is preferred, however, to age the catalyst for times of 12 hours to 1 day prior to the polymerization.

The inert hydrocarbon diluent used for preparing the catalyst solutions is that to be used as a reaction medium for the olefin polymerization process. Suitable inert hydrocarbons are the paraffinic and cycloparaffinic hydrocarbons having from 4 to 10 carbon atoms, such as butane, isobutane, pentane, isopentane, hexane, heptane, octane, decane, cyclopentane, cyclohexane, methylcyclohexane and aromatic hydrocarbons, such as benzene, xylene, toluene and the like. The choice of hydrocarbon may vary with the olefin to be polymerized. The use of hydrocarbons of 6 to 10 carbon atoms will reduce the pressure required for the reaction and may be preferred for safety and equipment cost considerations.

The activator-scavenger used in the polymerization process may be any of the organoaluminum compound known to be useful in Ziegler polymerization systems. The activator may be the same as or different from the organoaluminum compound used to form the supported catalyst.

The polymerization of ethylene is conveniently carried out in an autoclave or other suitable pressure apparatus. The apparatus is charged with solvent, if used and an activator-scavenger and allowed to equilibrate. The supported catalyst is then added and the reactor pressured with ethylene and a molecular weight regulator such as hydrogen, if used. Polymerization pressures depend mainly on the limitations of the equipment used, but a normal range of pressures would be from 1 to 50 atmospheres with a preferred range of from 6 to 40 atmospheres. Temperatures of polymerization usually are from 40° C. to 200° C., preferably between 70° and 100° C. The catalyst concentration suitable for the invention are between 0.001 and 10 millimoles of transition metal per liter of solvent, preferably between 0.005 and 0.25 millimoles per liter.

The polyethylenes produced with the catalyst of this invention has melt indices in the injection molding range, i.e. between 3.1 and 12.5 grams per 10 minutes, as measured by ASTM-1238 at 190° C. using a 2160 g. applied weight. The molecular weight distributions are relatively narrow i.e. 7.6-8.4 as measured by the ratio of melt index at 10 Kg weight to the melt index at 2 Kg weight as compared to 8.5-10. for polyethylenes prepared by other supported catalysts. The catalyst of the invention gives a polyethylene in the slurry process which has exceptionally high bulk density, i.e. greater than 20 pounds per cubic foot (pcf.), which makes physical handling of the polymer simpler and allows greater amounts of polymer to be produced per unit weight of solvent without the concommitant fouling of the reactor.

The following examples illustrate, but are not meant to limit the invention.

EXAMPLE I a. Catalyst Preparation

Anhydrous magnesium oxide was thermally activated by heating under vacuum at 210° to 300° C. for 18 hours. The oxide was then blanketed under purified nitrogen. In a 100 ml Schlenk type flask, 3.8 g. of this activated magnesium oxide was suspended in 60 ml. of n-hexane. To the suspension was added 0.76 ml. of methanol and the slurry stirred at 60° C. for 2 hours. The solvent was carefully drained off and the solid residue was dried under vacuum. After the solid support was completely dried, purified nitrogen was introduced to blanket the support along with 60 ml. of n-hexane to cover the support. Infrared analysis showed this support to have no methoxide or free methanol retained at this point. There was 0.2 moles of methanol per mole of oxide firmly bound to the support.

In a 50 ml. Schlenk type flask, 31.8 millimoles (mm.) of titanium tetrachloride was added to 10 ml. of n-hexane and 29.2 mm. of tetrabutyltitanate was mixed with this solution at room temperature for 5 minutes. This titanium solution was then added to the support slurry above and refluxed for 21 hours. The liquid was drained out and the solid was washed with 60 ml. portions of hexane five times. A stock solution was made by adding 80 ml. of hexane to the thus formed catalyst slurry.

A preactivated catalyst slurry solution was made by diluting 20 ml. of the stock solution with 20 ml. of hexane and adding 0.73 mm. of triethylaluminum. The preactivated catalyst slurry solution was then aged for 1 day before use. The catalyst contained 0.34 mm. of titanium per gram of catalyst.

b. Polymerization of Ethylene

Under purified nitrogen atmosphere, 1.5 l. of dry hexane was placed in a 1 gallon autoclave and 6.8 mm. of triethylaluminum was added as activator-scavenger. The autoclave was heated to 40° C. and 1 ml. of the aged, preactivated catalyst slurry solution was added. The temperature was then raised to 90° C. and the reactor pressured to 45 psig with hydrogen. The reactor pressure was raised to 150 psig and maintained at that pressure by adding ethylene as needed during the polymerization. The ethylene uptake rate was measured with a stainless steel ball flowmeter manufactured by Matheson. At the end of 2 hours, the polymerization was stopped by venting the autoclave, opening the reactor, and filtering the polyethylene from the liquid medium. The ethylene uptake was still 267 units per gram of catalyst at the 2 hour point. The polymer was dried under vacuum at 40° C. overnight. The yield was 207 g. polyethylene, melt index 4.2 g./10 minutes under a load of 2160 g. at 190° C., and bulk density of 24.1 pounds per cubic foot (pcf.). The catalyst efficiency was 58,000 g. PE/g.Ti. The polyethylene had a molecular weight distribution as measured by the ratio of melt index at 10 Kg. weight to the melt index at 2 Kg. weight ($MI_{10}/MI_2$) of 7.6.

COMPARATIVE EXAMPLE

For comparison purposes, the methanol treated magnesium chloride supported catalyst of U.S. Pat. No. 3,642,746 was prepared and utilized as follows:

a. Catalyst Preparation

A support of anhydrous magnesium chloride was treated with methanol by the procedure of Example Ia. Infrared analysis showed the methanol remained attached to the magnesium chloride after vacuum drying. The support was then refluxed with equimolar amounts of titanium tetrachloride and tetrabutyltitanate for 21 hours, separated and washed as in Ia. Preactivation with triethylaluminum (aluminum/Titanium =0.25) gave a catalyst having 0.03 millimoles of titanium per gram of catalyst.

b. Polymerization of Ethylene

The procedure of Example Ib. was followed using the above prepared magnesium chloride supported catalyst and triethylaluminum as activator-scavenger. After two hours, the ethylene uptake was only 123 units per gram of catalyst (measured by the Matheson flowmeter). The catalyst efficiency was 425,000 g. PE/g. Ti, but the polyethylene formed had a lower melt index of 2.3 g./10 min., a broader distribution of 8.2 ($MI_{10}/MI_2$), and a low bulk density of 16.9 pcf.

It can thus be seen that the methanol treated magnesium oxide supported catalyst of the present invention, although having lower catalyst efficiency for the first two hours of polymerization than the known methanol-treated magnesium chloride supported catalyst, retains a higher ethylene uptake and hence may have a longer catalyst life. The polymer prepared by the oxide supported catalyst has better injection molding properties, i.e. higher melt index, higher bulk density, and narrower molecular weight distribution.

EXAMPLE II

To illustrate the criticality of using a 1:1 ratio of titanium tetrachloride:tetrabutyltitanate as the titanium compound in the catalyst system of the invention, three catalysts A, B and C, wer prepared using the procedure of Example Ia. except that the titanium compounds used were altered to give the following catalyst compositions:

A. Equimolar tetrabutyltitanate:titanium tetrachloride on a magnesium oxide support containing 0.2 moles of methanol per mole of magnesium oxide.

B. One mole of tetrabutyltitanate per 0.8 mole of titanium tetrachloride on the same support as in Catalyst A.

C. Only titanium tetrachloride on the same support as in Catalyst A.

Polymerizations were run by the procedure of Example Ib. using Catalysts A, B and C, for a period of 1 hour. The catalyst activities were calculated and found to be, in grams of polyethylene per gram of catalyst per hour, 3,167 for A, 697 for B and 237 for C. Thus, only the 1:1 $TiCl_4$:TBT ratio catalyst gave high efficiency polymerization of ethylene in our system.

EXAMPLE III

To illustrate that residual methanol on the magnesium oxide support affects the catalyst productivity, several catalysts were made using the procedure of Example Ia. with 1:1 ratio of titanium tetrachloride:tetrabutyltitanate while varying the amounts of residual methanol during the vacuum drying step. Alternatively, in some instances the magnesium oxide support was treated with the desired ratio of methanol to oxide and only the hexane solvent removed. The catalysts were used to polymerize ethylene by the procedure of Example Ib. for 1 hour and then the polyethylene recovered. The catalyst efficiency, in grams of polyethylene per gram of catalyst per hour, and the molecular weight distribution of the polymer, measured by the ratio of $MI_{10}$ to $MI_2$ as before, are shown in the Table.

Table

| $CH_3OH/MgO$, Mole Ratio | Catalyst Efficiency, g. PE/g. cat./hr. | $MI_{10}/MI_2$ |
|---|---|---|
| 10 | 1,513 | 8.37 |
| 1 | 2,037 | 8.20 |
| 0.2 | 4,833 | 8.05 |
| 0.025 | 3,457 | 7.87 |
| 0.004 | 1,413 | 7.84 |

Thus, at methanol to oxide ratios of from 0.004 to 10, the catalysts having 1:1 titanium tetrachloride:tetrabutyltitanate compound on the support gave high yields of polymer having relatively narrow molecular weight distribution of 7.8-8.5. Although not shown in the Table, a catalyst having only titanium tetrachloride on the support gave much lower yield of polymer, and the polymer had a broad distribution of 9.5.

I claim:

1. A catalyst for the low to intermediate pressure polymerization of ethylene in the presence of an organoaluminum activator, consisting of a solid complex component obtained by heating a support of anhydrous magnesium oxide in hexane with methanol, removing the excess methanol by drying the support in a vacuum to form a support containing between 0.004 and 10 moles of methanol per mole of magnesium oxide, refluxing the treated magnesium oxide with an equimolar mixture of titanium tetrachloride and tetrabutyltitanate, removing any excess titanium compound by repeated washing of the support with an inert hydrocarbon solvent, reducing said titanium compound on said support by reacting with an organoaluminum compound in an amount such that the aluminum to titanium ratio is between 0.05 and 0.5 and said organoaluminum compound is of formula $R_nAlX_{3-n}$, wherein R is a hydrocarbon radical selected from branched or linear alkyl, alkenyl, cycloalkyl, aryl, alkylaryl, or arylalkyl radicals having 1 to 20 carbon atoms, X is hydrogen or halogen, and n is 1, 2 or 3, and ageing the resulting supported complex.

2. The catalyst of claim 1 wherein the support formed by heating with methanol contains from 0.01 to 0.8 moles of methanol per mole of magnesium oxide.

3. A method for the preparation of a catalyst for the polymerization of olefins which comprises treating an anhydrous magnesium oxide support in hexane with methanol, removing the excess methanol from the magnesium oxide by drying the support under a vacuum to form a support containing between 0.004 and 10 moles of methanol per mole of magnesium oxide, refluxing the treated magnesium oxide with an equimolar mixture of titanium tetrachloride and tetrabutyltitanate, removing any excess titanium compound by repeated washing of the support with an inert hydrocarbon solvent, reducing said titanium compound on the support by reacting with an organoaluminum compound in an amount such that the aluminum to titanium ratio is between 0.05 and 0.5, and aging the resulting supported complex.

* * * * *